Patented May 11, 1943

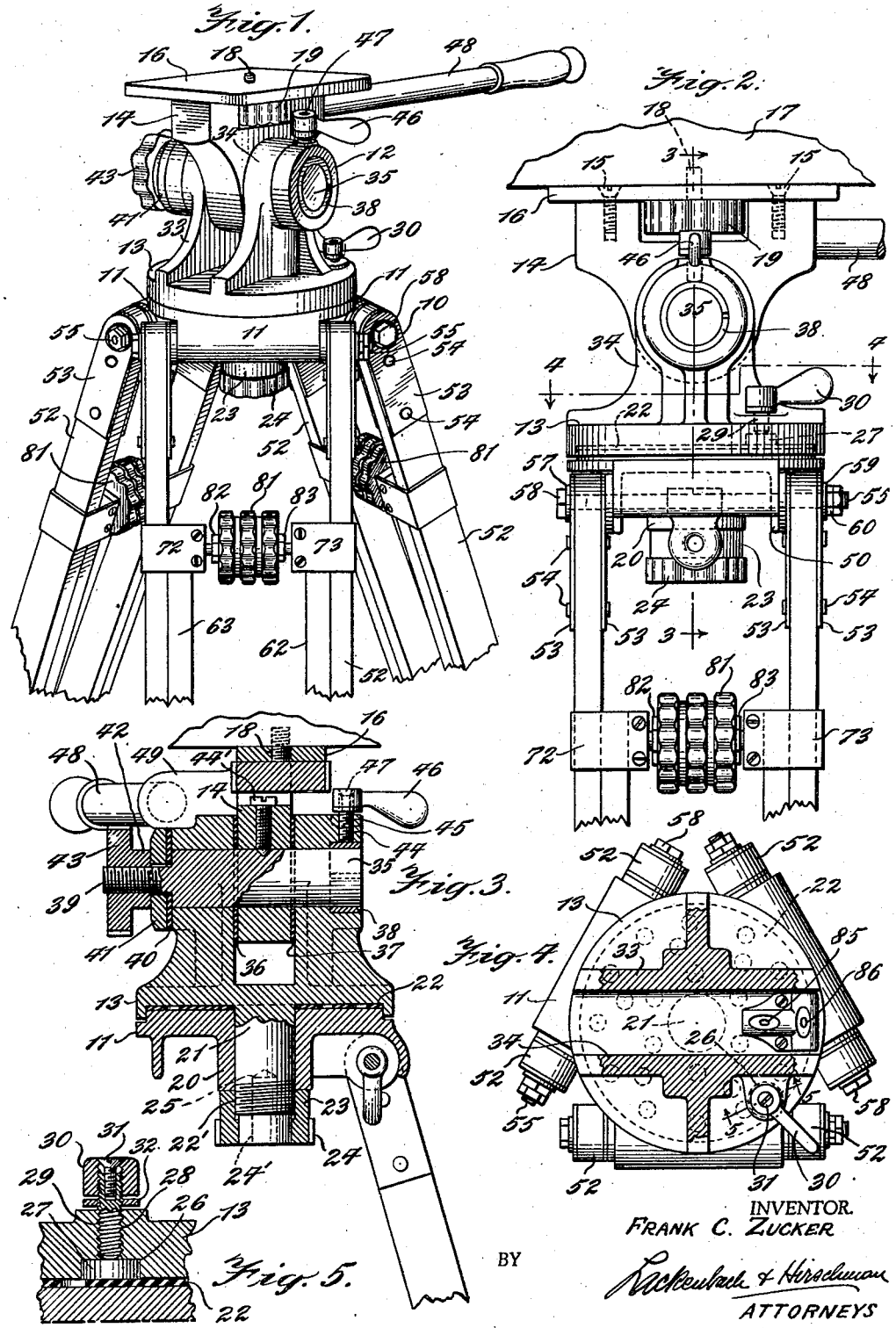

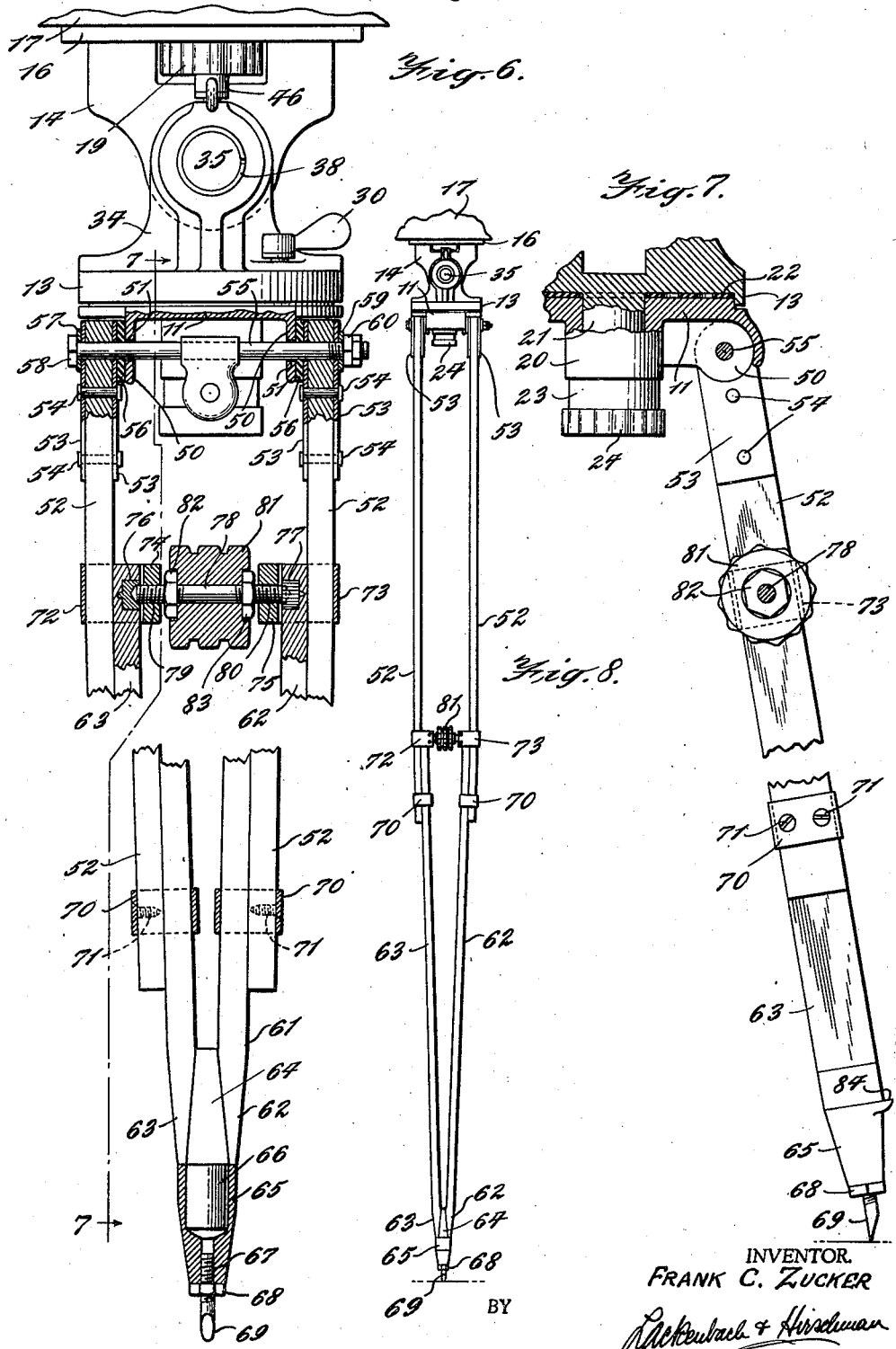

2,318,910

UNITED STATES PATENT OFFICE 2,318,910

ADJUSTABLE INSTRUMENT SUPPORT

Frank C. Zucker, New York, N. Y.

Application August 4, 1941, Serial No. 405,302

5 Claims. (Cl. 248—183)

The present invention relates to a device for supporting an instrument, such as a camera, surveyor's transit, etc. More particularly the invention relates to an adjustable tripod head so constructed that the instrument may be conveniently directed by the operator, independently of the tripod, in any desired direction and at any desired angle, and to a tripod having adjustable legs so constructed that each of the legs may be, with facility, individually lengthened or shortened to accommodate the tripod to all conditions of use regardless of the topography of the surface upon which the tripod is to be placed and firmly positioned.

In photography, it is important that the tripod upon which the adjustable head and camera rest, be so arranged that a firm base is provided. Often it is desirable to be able to adjust the tripod legs quickly so that a particularly desirable shot might be made and yet still be assured of a solid base for the camera. Particularly in motion picture photography, where shots are taken at various angles and often are panoramic in scope, it is desirable that the camera be capable of being shifted smoothly, without moving the tripod, through a smooth arc so that the field is swept uniformly and the resultant picture is free from jerkiness when finally viewed.

It is an object of my invention to provide a tripod which has adjustable legs enabling the operator to quickly and conveniently position a tripod in such a manner that a firm base is provided for the instrument.

It is a further object of my invention to provide a camera or instrument head which can be utilized to obtain a panoramic view by enabling the instrument to be swung smoothly through any desired arc.

It is a still further object of my invention to provide a camera or instrument head which is adjustable horizontally but which may be fixed in a rigid position relative to horizontal movement by manual adjustment.

It is another object of my invention to provide a camera or instrument head which is adjustable vertically but which may be fixed in a rigid position relative to vertical movement by manual adjustment.

It is another object of my invention to provide a camera or instrument head which has a removable handle for controlling the head, said handle being disposed in such a manner that it does not interfere with the sighting of an instrument positioned on the head, and which handle will be at all times substantially free of interference by the body of the operator.

In accordance with my novel construction, there is provided a tripod and a tripod head, each leg of said tripod comprising two arms pivoted on the tripod head, a bifurcated member slidably attached to said pivoted arms and a clamping device positioned between the arms of the bifurcated member so constructed that the slidable bifurcated member may be held in any desired position relative to the two pivoted arms by manual adjustment of said clamping device, a tripod head adjustable about a vertical and a horizontal pivot, a removable table adapted to be attached to said tripod head to which an instrument such as a camera may be attached, a handle, removably attached to said head and disposed laterally of its center, so that the operator may sight through the instrument without interference from said handle, said tripod head being adapted to be swung by means of said handle through any desired arc whereby said optical device may sweep any view which the operator may desire to view or photograph. In accordance with my invention, the head is provided with means whereby the operator may manually fix said head against either horizontal or vertical movement so that the optical device may be maintained rigid against either horizontal or vertical movement or both.

My construction is characterized by the fact that the operator may easily and quickly position the tripod firmly, so that after the operator begins the process of taking pictures, all further adjustments may be made on the tripod head without the necessity for any change being made in the tripod legs, or if desired, any change in the tripod head may be made with facility. The legs of the tripod, constructed in accordance with my invention, may be lengthened or shortened with comparative ease by means of my novel clamping device. Another advantage of my invention is that by reason of the simplicity of construction, I am able to obtain a smooth horizontal or vertical adjustment of the head so that a panoramic sweep may be made by an optical instrument, particularly a camera without any jerkiness whatsoever and at the same time making it possible for the operator by manual adjustment to rigidly maintain the camera against horizontal or vertical movement or against either horizontal movement while still permitting vertical adjustment or against vertical movement while still permitting horizontal adjustment.

While in prior constructions, certain adjustable heads have been suggested, none has possessed the simplicity and flexibility of my inventive structure. Furthermore, these devices of the prior art by reason of their complicated structures had the adjustable head so constructed that the handle protruded from approximately the center of the head. Thus, if an operator desired to sight the camera the handle would interfere with the proper sighting. By my novel construction I am enabled to dispose the handle laterally of the center, so that the handle does not obstruct the operator when he is sighting through the instrument but rather the operator may sight through the instrument while maintaining a convenient grasp on the handle so that the adjustments desired in taking the pictures may be made with facility.

Another advantage of my invention is the relatively simple manner in which I may rigidly position a camera when associated with my novel construction when it is desired to take a "still" picture or in cases when it is not desired to move the camera after it has been once adjusted. By simple manual adjustments, the entire adjustable head may be made non-movable.

In the accompanying drawings, I have illustrated, by way of example but not by way of limitation, a specific embodiment of my invention. In such drawings:

Fig. 1 is a perspective view of the camera head and also a fragmentary view of the tripod showing the tripod clamping device;

Fig. 2 is a side view thereof and showing a portion of the camera attached to the table of the camera head;

Fig. 3 is a sectional view of the camera head, the section being taken along lines 3—3 of Fig. 2;

Fig. 4 is a sectional plan view taken along the lines 4—4 of Fig. 2;

Fig. 5 is a sectional detail view of the clamping device along the lines 5—5 of Fig. 4;

Fig. 6 is a side elevational view, partly in section showing the tripod legs and the tripod clamping device;

Fig. 7 is a side elevational view partly in section along the lines 7—7 of Fig. 6 showing one of the tripod legs; and Fig. 8 is a side elevational view, partly in section, along 8—8 of Fig. 6 showing the construction of one of the tripod legs.

Referring more particularly to the drawings, in which similar reference characters identify similar parts in the several views, 10 designates a tripod having a tripod head 11 upon which rests an adjustable head designated generally as 12 which is constructed and arranged to permit rotation about a vertical axis and tilting about a horizontal axis. Said adjustable head comprises a lower base member 13 and a pivoted tilting member 14 pivotally secured to said adjustable head member 13 adapted to be turned about a horizontal axis, said upper pivoted base member 14 being adapted to have secured thereto by means of screws 15 a plate 16 acting as a table on which a camera 17 may be placed. Cameras are ordinarily provided with screw sockets into which a suitable clamping screw 18 extends after passing through the plate 16. The screw 18 has an enlarged notched head 19 so that the screw may be easily inserted into the camera base and screwed in so that the bottom of the camera 17 will be tightly held against the upper surface of the table 16.

The tripod head 11 has a downwardly depending centrally located cylindrical portion 20 having a vertical through aperture. The lower base member 13 has a downwardly depending stud 21 adapted to fit into the hollow cylindrical portion 20. A friction composition washer 22 having a plurality of circular cut-outs is placed between the lower base member 13 and the upper surface of the tripod head 11. The stud 21 is externally threaded at 22'. A nut 23 having a notched handle 24 is adapted to be screwed onto the stud 21 to urge the member 13 and the tripod head 11 against the friction washer 22. The nut 23 and the stud 21 are internally bored and threaded at 24' and 25 respectively.

The lower base member 13 has a circular recess at 26 in which a circular metal plate 27 is positioned, said circular metal plate 27 resting on the friction washer 22; the lower base member 13 is threaded at 28 to receive a screw 29 which has a wing nut 30 secured thereto by a screw 31. A washer 32 is disposed between the wing nut 30 and the top of the lower base member 13.

The lower base member 13 has two standards 33 and 34 which have circular apertures therein through which a pivot shaft 35 which acts as a horizontal axis is adapted to pass. The tilting member 14 has a circular aperture adapted to be placed in registry with the circular apertures of the standards 33 and 34. The pivot shaft 35 passes through these circular apertures of the standards and the tilting member 14 to maintain the tilting member in pivoted relation to the base member 13. Friction washers 36 and 37 are disposed between the tilting member 14 and the standards 33 and 34, respectively.

A split ring 38 fits over the shaft 35 at one of its ends and is positioned within the circular aperture in the standard 34, the other extremity of the pivot shaft 35 being reduced in cross section externally threaded at 39. A washer 40 fits over the pivot shaft 35 at the end of reduced cross-section. A metal annulus 41 is positioned on the shaft adjacent the end of reduced cross-section and engages the washer 40. A nut 42 is screwed on the pivot shaft 35 on the threads 39. This nut 42 has an enlarged notched handle 43.

The pivot shaft 35 is kept from rotating relative to the upper base member 13 by the screw 44' which also keeps the pivot shaft 35 from sliding out longitudinally relative to the standards 33 and 34.

The standard 34 is threaded at 44 to receive a screw 45. A wing nut 46 is screwed on the screw 45 and held in place by a set-screw 47.

A long handle 48 to aid in tilting and rotating the adjustable head 12 is adapted to be screwed into the upper pivoted base member 14 on the extension 49 of the base member 14 which is laterally disposed of the screw 18 as is indicated by dotted lines in Fig. 3. The handle 48 is adapted also to be screwed into the internally threaded portions 24' and 25 of the nut 23 and the stud 21 when not in use.

The tripod head 11 has a plurality of downwardly depending projections 50 which have circular apertures 51 therein, the projections 50 being adapted to have the tripod legs pivotally secured thereto.

Each tripod leg comprises two limbs 52 which have metal fastenings 53 riveted or bolted on as at 54. The limbs 52 are pivotally secured to the tripod head 11 by a bolt 55 which passes through the circular apertures 51 of the tripod head 11 and circular apertures in the limbs 52 and their metal fastenings 53. Washers 56 are positioned between the metal fastenings 53 and the tripod head 11 on the bolt 55. A metal washer 57 rides on the bolt 55 and rests against the bolt head 58 and a metal washer 59 rides on the bolt 55 on the other end against which the nut 60 engages to hold the limbs in position.

Each leg of the tripod comprises a bifurcated foot 61 which has two members 62 and 63 which meet a key 64. The lower extremities of the members 62 and 63 are joined to the key 64 which fits into a metal retaining member 65 of the lower portion 66 of the key 64. The metal retaining member 65 is internally threaded to receive a pointed screw 67. A nut 68 screws on the threaded portion 67 to hold the pointed extremity 69 of the cylinder 66 in its desired relation.

A metal sliding band 70, acting as a guide, is secured to the limbs 52 as by screws 71 to hold the limbs 52 in juxtaposition to the members 62 and 63 of the bifurcated foot.

At the upper parts of the members 62 and 63 of the bifurcated foot there are provided two U-shaped bands 72 and 73 which are secured to metal members 74 and 75, which metal members are internally threaded. The members 62 and 63 have metal inserts 76 and 77 positioned therein which have a depression at their center to receive a shaft 78 which is threaded in opposite directions, i. e. one right hand thread at 79 and one left hand thread at 80. The shaft 78 has a notched handle 81 disposed at its center and held in place by nuts 82 and 83.

The ends of the shaft 78, by turning the handle 81, thus turning the screw within the metal members 74 and 75 which are appropriately threaded, exert compression upon the metal inserts 76 and 77. This serves to firmly hold the two bifurcated members 62 and 63 firmly against the limbs 52 and prevents any sliding between the parts.

I may provide a foot rest 84 upon which the operator may press his foot to place the tripod firmly in place when it is set upon soft ground.

I may also provide indicating devices 85 and 86 upon the base member 13 to indicate whether the base member is level with respect to the ground. This is useful when the tripod is used as a base for surveying instruments and other optical devices which operate more satisfactorily with an absolutely level table.

In the utilization of my novel construction my invention is characterized by the relative ease with which the device is used and the adjustments desired made. In the setting up of the tripod itself all that is required of the operator is a turn of the handle 81 to loosen the compression upon the two metal inserts 76 and 77 whereupon the bifurcated foot 62 is enabled to slide up or down relative to the two arms 52, the bands 72 and 73 and the bands 70 serving to hold the parts in slidable adjustment. When the desired length of the leg is attained the handle is turned in the opposite direction thereby exerting a compression against the metal inserts 76 and 77 thus holding the bifurcated foot tightly against the limbs 52.

It may be desired to embed the pointed end 69 of the screw 67 in the ground in which case loosening of the nut 68 enables the screw 67 to be extended or withdrawn to enable the pointed screw to extend into the ground at any desired depth. The foot rest 84 enables the operator to press the point 69 deeply into the ground. In the case of delicate instruments such as a surveying instrument, it may be desired to have the base member 13 absolutely level. In such a case the indicating devices 86 and 85 are observed and the legs adjusted by means of the handle 81 until the bubbles indicate that the instrument is on a level.

After the tripod legs have been adjusted, the operator notes the adjustment of the adjustable head. In the case when adjustment is required, this is effected as follows:

The swivel adjustment is effected by grasping the handle 24 and turning the nut 23 until the compression thus exerted upon the friction washer 22 by the tripod head 11 and the base member 13 is such that the friction acts to leave the camera in any adjusted position but the exercising of a small horizontal torque will serve to permit the adjustable head to be rotated about a vertical axis. The clamping member for fixing the member 13 against horizontal rotation is adjusted as follows: The screw 28 is turned until it just rests on the metal plate 26. The wing nut 30 is then set in place by screwing in the screw 31 so that about a 15 degree turn results in the screw forcing the plate 26 against the friction washer 22 so that the setting desired may be made rigid against horizontal movement about the vertical axis. Thus, once it is desired to have a fixed setting, a slight turn of the wing nut 30 is required and when a movable setting is desired, another slight turn of the wing nut in the opposite direction permits the member 13 to be rotated.

The tilting adjustment of the adjustable head is effected as follows:

The screw 44' is screwed onto the tilting shaft 35 so that the tilting shaft cannot rotate relative to the tilting member 14 and also holds the shaft 35 from sliding out longitudinally. The handle 43 is grasped by the operator and turned, thus causing the nut 42 to urge the metal annulus 41 against the washer 40. The compression thus exerted plus the frictional component of the two washers 36 and 37 disposed between the tilting members 14 and the standards 33 and 34 serve to position the camera in any adjusted position but still permitting the tilting member 14 to be turned by the exercise of a slight vertical torque. The wing nut 46 is then adjusted in a manner similar to that described in connection with wing nut 30. The screw is inserted until it just touches the split ring 38. Then the screw 47 is inserted holding the wing nut 46 in place. A slight turn of the wing nut by the operator thus enables one to position the tilting member rigidly against tilting, the tilting member being held in the required position.

The camera may be placed in position easily by placing the camera over the plate 16, the screw 18 being in registry with the screw socket of the camera and the operator turning the head 19 of the screw 18, until the camera bottom is tightly held against the upper surface of the table 16.

The tilting of the tilting member 14 and its rotation as well as the rotation of the member 13 is effected by the operator grasping the long handle 48 which is offset to one side on the tilting member 14 on the extension 49. The offsetting of this handle enables the operator to sight through the camera without any interference from the handle, i. e., the camera may be sighted and the handle grasped by the operator with the utmost of convenience without interfering with the body of the operator. It is apparent that the member 14 may be tilted and likewise, therefore, the camera 17, by moving the handle 48 in a vertical arc thus causing the member 14 to rotate on the pivot shaft 35. By moving the handle 48 in a horizontal arc, the members 14 and 13 are rotated about a vertical axis and the camera 17 is likewise rotated to sweep the view horizontally. It is obvious that both vertical and horizontal movement may be effected simultaneously to attain any desired sweep.

If it is desired, for example, to focus a camera on a particular spot, the wing nuts 46 and 30 are given a slight turn and the adjustable head is thus maintained in fixed position. If only a horizontal sweep is desired, the wing nut 46 is turned and if only a tilting is desired, the wing nut 30 is turned slightly.

It will be apparent from the above description that I have provided a novel tripod and adjustable head which has numerous advantages which may be summarized as constituted by the provision of adjustable tripod legs which may be adjusted to fit any topography or condition of use and an adjustable head which enables the operator by conveniently grasping an offset handle to smoothly sweep the field desired to be viewed or photographed while at the same time enabling the adjustable head to be rigidly positioned relative to either horizontal or vertical movement.

While I have described a particular embodiment of my inventive structure, it is obvious that various changes may be made without departing from the spirit of my invention.

I claim:

1. In a support for an instrument, a tripod head, a rotatable base member positioned above said tripod head, said rotatable base member having two apertured standards, a shaft supported within the apertures of said standards, said shaft carrying a tilting base member movable vertically about the axis of the shaft, means to prevent said tilting member from moving vertically relative to the shaft, friction means resisting the free rotation of said shaft, a split ring member positioned around one end of said shaft within one of the apertures of one of said standards, and tightening means including a screw for preventing said tilting member from vertical movement by rigidly clamping said split ring member against said shaft.

2. In a support for an instrument, a tripod head, a rotatable base member positioned above said tripod head, said rotatable base member having two apertured standards, a shaft supported within the apertures of said standard, said shaft carrying a tilting base member movable vertically about the axis of the shaft, means to prevent said tilting member from vertical movement relative to the shaft, a split ring positioned around one end of said shaft within one of the apertures of said standards, the other end of said shaft being of smaller diameter and externally threaded to receive a nut, friction means on said shaft positioned between said tilting member and said standards, a friction disc positioned on said shaft on the end of said shaft adjacent the threads, a metal washer adjacent said friction disc on said shaft, said nut when screwed on acting to urge said washer against said friction disc and against the outside of one of said standards to resist free rotation and tightening means for preventing said tilting member from vertical movement by rigidly clamping said split ring member against said shaft.

3. In a supporting head for an instrument, a tripod head, a base member positioned above and rotatable relative to said tripod head about a vertical axis, said rotatable base member having two apertured supports, a shaft supported within the apertures of said supports, said shaft carrying a tilting base member movable vertically about the axis of the shaft, means to prevent said tilting member from moving vertically and horizontally relative to the shaft, a split ring member positioned around said shaft within one of the apertures of one of said standards, means for clamping said split ring member against said shaft and means for clamping said tilting member against movement in any desired position.

4. In a support for an instrument, a rotatable base member, a shaft positioned on said base member, a tilting base member supported on said shaft and movable vertically about the axis of the shaft, means to prevent said tilting member from vertical movement relative to the shaft, a split ring positioned around one end of said shaft, the other end of said shaft being of smaller cross section and externally threaded to receive a nut, a metal washer adjacent one of said friction means on said shaft, said nut when screwed on acting to urge said washer against one of said friction means, and tightening means for preventing said tilting member from vertical movement by rigidly clamping said split ring member against said shaft.

5. In a support for an instrument, a tripod head, a base member rotatable about a vertical axis positioned above said tripod head, a shaft having an axis at right angles to the axis of the base member positioned on said base member, said shaft carrying a tilting base member movable vertically about the axis of the shaft, means to prevent said tilting member from moving vertically relative to the shaft, a split ring member positioned around said shaft within one of the apertures of one of said standards, and tightening means for preventing said tilting member from vertical movement by rigidly clamping said split ring member against said shaft.

FRANK C. ZUCKER.